(12) United States Patent
Rimet

(10) Patent No.: US 12,403,535 B2
(45) Date of Patent: Sep. 2, 2025

(54) CUTTING TOOL ASSEMBLY

(71) Applicant: SECO TOOLS AB, Fagersta (SE)

(72) Inventor: Lilian Rimet, Fagersta (SE)

(73) Assignee: Seco Tools AB, Fagersta (SE)

( * ) Notice: Subject to any disclaimer, the term of this patent is extended or adjusted under 35 U.S.C. 154(b) by 659 days.

(21) Appl. No.: 17/779,415

(22) PCT Filed: Sep. 3, 2020

(86) PCT No.: PCT/EP2020/074522
§ 371 (c)(1),
(2) Date: May 24, 2022

(87) PCT Pub. No.: WO2021/098998
PCT Pub. Date: May 27, 2021

(65) Prior Publication Data
US 2022/0410280 A1    Dec. 29, 2022

(30) Foreign Application Priority Data

Nov. 22, 2019   (EP) ..................... 19210943

(51) Int. Cl.
*B23B 31/107*    (2006.01)
*B23B 29/04*    (2006.01)
(Continued)

(52) U.S. Cl.
CPC ........ *B23B 31/107* (2013.01); *B23B 31/1077* (2013.01); *B23B 29/046* (2013.01); *B23B 31/008* (2013.01); *B23B 2231/24* (2013.01); *B23B 2260/056* (2013.01); *B23D 77/006* (2013.01)

(58) Field of Classification Search
CPC ... B23B 29/046; B23B 31/008; B23B 31/107; B23B 31/1077; B23B 2231/24; B23B 2260/056; B23D 77/006; Y10T 279/17675
See application file for complete search history.

(56) References Cited

U.S. PATENT DOCUMENTS 2,485,799 A   10/1949   Woytych
2,684,249 A   7/1954   Woytych
(Continued)

FOREIGN PATENT DOCUMENTS

| DE | 102006043733 A1 | * | 3/2007 | ........... B23B 31/005 |
| DE | 202007014300 U1 | * | 1/2008 | ........... B23B 31/005 |
| DE | 202015104652 U1 |   | 9/2015 | |

*Primary Examiner* — Eric A. Gates
(74) *Attorney, Agent, or Firm* — Corinne R. Gorski

(57) ABSTRACT

A cutting tool assembly includes a first tool part and a second tool part. The first tool part has a forward end portion including a cutting edge and a rearward end portion having a conical section and an engagement section. The second tool part includes a conical recess and a clamping device rearwards the conical recess. The clamping device is provided in a transversal cavity of the second tool part and has a first clamp block, a second clamp block and a differential screw engaging the first and second clamp blocks. The first and second clamp blocks engage the engagement section of the first tool part to pull the first tool part into the conical recess when the first and second clamp blocks are moved towards each other by the differential screw protruding rearwards from the first and second clamp blocks.

18 Claims, 7 Drawing Sheets

(51) Int. Cl.
    *B23B 31/00*      (2006.01)
    *B23D 77/00*      (2006.01)

(56) References Cited

U.S. PATENT DOCUMENTS

| | | | | |
|---|---|---|---|---|
| 4,729,702 | A * | 3/1988 | Kelm | B23B 31/1076 |
| | | | | 409/234 |
| 4,784,542 | A * | 11/1988 | Tack | B23B 29/046 |
| | | | | 408/239 R |
| 7,077,608 | B2 * | 7/2006 | Hartman | B23B 31/028 |
| | | | | 408/239 R |
| 8,033,766 | B2 * | 10/2011 | Erickson | B23C 5/10 |
| | | | | 409/234 |
| 2012/0200050 | A1 | 8/2012 | Kretzschmann et al. | |
| 2021/0046558 | A1 * | 2/2021 | Matlik | B23B 31/265 |

* cited by examiner

CUTTING TOOL ASSEMBLY

RELATED APPLICATION DATA

This application is a § 371 National Stage Application of PCT International Application No. PCT/EP2020/074522 filed Sep. 3, 2020 claiming priority to EP 19210943.7 filed Nov. 22, 2019.

TECHNICAL FIELD OF THE INVENTION

The present invention refers generally to a cutting tool assembly, in particular a rotating cutting tool assembly configured for machining of elongated holes, i.e. relatively long and thin holes, such as valve guides for internal combustion engines in the automotive industry. The invention is however not limited to this specific application, but may be applied to the machining of any elongated holes. In particular, the present invention refers to a cutting tool assembly according to the pre-characterizing portion of claim 1.

BACKGROUND OF THE INVENTION AND PRIOR ART

DE 20 2015 104 652 discloses a rotating cutting tool assembly comprising a first tool part having a cutting edge, and a second tool part releasably holding the first tool part. The first tool part is elongated and extends along a longitudinal axis. The first tool part comprises a forward end portion comprising the cutting edge and a rearward end portion comprising a conical section, tapering away from the forward end portion, and an engagement section located rearwards the conical section. The second tool part comprises a conical recess receiving the conical section of the first tool part, and a clamping device located rearwards the conical recess, The clamping device of DE 20 2015 104 652 comprises a sleeve having a number of tongues extending in a longitudinal direction in a central bore of the second tool part. The tongues may grip the engagement section of the first tool part and may be pulled rearwards in order to secure the first tool part in the recess of the second tool part. The pulling movement of the sleeve and the first tool part is made from a rearward end of the second tool part, which means that the rearward end needs to be accessible. In practice the second tool part therefore needs to be released from the machine tool when the first tool part is to be exchanged or replaced.

A further disadvantage of prior art rotating cutting tool assembly is the relatively long axial length of the clamping device. The clamping device extends significantly rearwards in the tool holder, which increases the total length of the tool with negative implications on the usefulness of the tool.

SUMMARY OF THE INVENTION

The purpose of the present invention is to overcome the disadvantages discussed above and to provide a cutting tool assembly that may be disassembled and assembled in an easy manner, and that may be designed with a short total length.

This purpose is achieved by the cutting tool assembly initially defined, which is characterised in that the clamping device is provided in a transversal cavity of the second tool part and comprises a first clamp block, a second clamp block and a differential screw extending along a transversal axis and engaging the first and second clamp blocks, wherein the differential screw is configured to move the first and second clamp blocks in parallel with the transversal axis away from and towards each other, that the first and second clamp blocks comprise a respective engagement surface arranged to engage the engagement section of the first tool part, when the conical section is placed in the conical recess, in order to pull the first tool part into a holding position in the conical recess when the first and second clamp blocks are moved towards each other, and that each of the first and second clamp blocks comprises a respective threaded channel extending in parallel with the transversal axis and receiving the differential screw protruding rearwards from the first and second clamp blocks beyond the threaded channels.

According to the invention, the differential screw of the clamping device may be accessible from the side of the second tool part, and may thus be manipulated and rotated in a clamping direction from the side of the second tool part to move the first and second clamp blocks to engage the engagement section of the first tool part. No access to the second tool part from behind is needed for the exchange of the first tool part. The second tool part may thus remain in the machine tool, or form an integrated part of the machine tool, during exchange of the first tool part. The exchange of the first tool part, for instance a reamer, may thus be made much quicker.

Furthermore, the clamping device may have a significantly short axial length thanks to the configuration with the protruding differential screw, contributing to a compact and axially short design of the second tool part. The first and second clamp blocks may not have to extend axially beyond the differential screw.

According to an embodiment of the invention, the transversal cavity of the second tool part extends in the transversal direction through the second tool part. The differential screw may thus be accessible from two opposite sides of the second tool part.

According to an embodiment of the invention, the second tool part may comprise or constitute a tool holder, or may form an integrated part of a machine tool.

According to an embodiment of the invention, the first tool part may be elongated. The first tool part may thus have an axial length that is at least 2 or 3 or 4 or 5 or 6 or 7 or 8 or 9 of 10 or more times the cutting diameter $D_C$. The cutting diameter $D_C$ is defined as two times the distance between the longitudinal axis and the cutting edge of the first tool part.

According to an embodiment of the invention, each of the threaded channels has an elongated opening, which extends in parallel with the transversal axis through a rearward end of the first and second clamp blocks, respectively, wherein the differential screw protrudes rearwards through the openings.

According to an embodiment of the invention, each of the threaded channels, seen in a plane perpendicular to the transversal axis, has a central angle $\beta$ having a first ray that intersects a first edge of the elongated opening and a second ray that intersects a second edge of the elongated opening, and wherein $180° < \beta < 360°$. A vertex of the angle $\beta$ is situated on a central axis of the threaded channel. This configuration of the channels, where the central angle is $180° < \beta < 360°$, may contribute to a significant shortening of the length of the first and second clamp blocks in comparison with clamp blocks having circular cylindrical threaded channels with a full peripheral length, i.e. threaded channels where the angle β is equal to 360°. More preferably, 200°≤β≤330°, even more preferably 220°≤β≤300° and most preferably β=240°. When 200°≤β, assembling of the differential screw into the clamp blocks is facilitated. When 220°≤β, assembling of the clamping device into the second tool part is significantly easier. When β≤330°, the clamp blocks are shortened more significantly, and the manufacturing is facilitated. When β≤300°, a width of the elongated opening is easier to control.

According to an embodiment of the invention, the clamping device comprises an elastic retaining ring extending around the second tool part and the first and second clamp blocks, wherein the retaining ring retains the first and second clamp blocks in the transversal cavity of the second tool part. This is particularly advantageous when the transversal cavity extends through the second tool part, but also when the transversal cavity extends through only one side of the second tool part.

According to an embodiment of the invention, the retaining ring is provided in a circumferential groove of the second tool part. The circumferential groove may extend over the transversal cavity.

According to an embodiment of the invention, the differential screw comprises a first threaded part cooperating with the threaded channel of the first clamp block and a second threaded part cooperating with the threaded channel of the second clamp block, wherein at least one of the first threaded part and the second threaded part protrudes rearwards from the respective first and second clamp block beyond the respective threaded channel. At least one of the first threaded part and the second threaded part may thus have a segment located rearwards the respective clamp block. The first and second clamp block may thus have a shorter axial length as explained above. Advantageously, both the first threaded part and the second threaded part protrudes beyond the respective threaded channel.

According to an embodiment of the invention, the cutting tool assembly comprises a coolant system for the supply of coolant to the cutting edge, wherein the coolant system comprises a first central channel through the first tool part and a second central channel through the second tool part, wherein the clamping device and/or the transversal cavity is configured to permit coolant to flow through the second central channel into the first central channel. The coolant may thus bypass the differential screw, and preferably pass through a gap in the transversal cavity between the first and second clamp blocks. When seen in the direction of the transversal axis, the transversal cavity may have a shape that is concentric to the shape of the clamping device. Thanks to this, a loss of coolant is minimized but also contamination of the clamping device is minimized when machining without coolant. Sealing between the clamping device and the transversal cavity may also be provided, or sealing of the transversal cavity. Proper cooling of the cutting edge and the workpiece may thus be ensured.

According to an embodiment of the invention, the differential screw comprises a restricted mid portion between the first threaded part and the second threaded part, wherein the coolant is permitted to flow through the second central channel into the first central channel thereby bypassing the restricted mid portion of the differential screw.

According to an embodiment of the invention, the engagement section comprises a first transversal groove and a second transversal groove, which are separated from and located diametrically opposite to each other and comprise a respective inclined forward surface turned towards the conical section. By the provision of such transversal grooves, a high strength of the engagement section may be ensured. In particular, the strength may be improved in comparison to only one circumferential groove extending all the way around the engagement section.

According to an embodiment of the invention, the first and second clamp blocks comprise a respective engagement surface engaging a respective one of the inclined forward surfaces in order to pull the first tool part into the holding position in the conical recess when the first and second clamp blocks are moved towards each other. The engagement surfaces of the first and second clamp blocks may be inclined and turned rearwards towards the differential screw. Advantageously, the engagement surfaces of the first and second clamp blocks may be inclined with an angle of inclination that corresponds to an angle of inclination of the inclined forward surfaces of the respective transversal groove.

According to an embodiment of the invention, each of the first and second transversal grooves has a bottom line being perpendicular to the longitudinal axis when seen in a direction from the first transversal groove to the second transversal groove.

According to an embodiment of the invention, the bottom line is convexly curved. The convexly curved bottom line may contribute to further ensure the strength of the engagement section of the first tool part.

According to an embodiment of the invention, the bottom line has a radius of curvature being longer than a smallest radial distance from the bottom line to the longitudinal axis.

According to an embodiment of the invention, the engagement section comprises two inclined rearward surfaces turned away from the conical section and configured to be engaged by a respective forward surface of the first and second clamp blocks in order to push the first tool part out of the holding position in the conical recess when the first and second clamp blocks are moved away from each other. By rotating the differential screw in a releasing direction, being opposite to the clamping direction, the first tool part may thus be pushed out of the conical recess of the second tool part against the friction forces between the conical section and the conical recess. These forces may be significant, especially in case of a small cone angle of the conical section of the first tool part. The inclined rearward surfaces may be positioned opposite to a respective one of the inclined forward surfaces of the first and second transversal grooves, and may be comprised by a rearward end side of the engagement section of the first tool part. The configuration with the two transversal grooves may be particularly advantageous in combination with this function given by the inclined rearward surfaces and the respective forward surface of the first and second clamp blocks, since loss of chips or splinter from the engagement section may be avoided or may occur less frequently in comparison with a configuration with only one circumferential groove extending all the way around the engagement section.

According to an embodiment of the invention, the conical section of the rearward portion of the first tool part has a cone angle α, and wherein $0.5° \leq α \leq 10°$.

According to an embodiment of the invention, the rearward end portion of the first tool part comprises at least one axial groove extending along the conical section, wherein the conical recess of the second tool part comprises at least one axial groove, wherein a pin is provided in the at least one axial groove of the second tool part and arranged to co-operate with the at least one axial groove of the first tool part to permit torque transmission between the second tool part and the first tool part when the first tool part is mounted in the second tool part. A central axis of the at least one pin is preferably parallel with the longitudinal axis of the first tool part. Also, a direction of extension of the at least one axial groove extending along the conical section is preferably parallel with the longitudinal axis of the first tool part. Advantageously, the rearward end portion of the first tool part comprises three axial grooves cooperating with a respective pin arranged in a respective axial groove of the conical recess of the second tool part.

According to an embodiment of the invention, the forward end portion of the first tool part is integrally formed with the rearward end portion of the first tool part. The forward end portion may comprise an elongated tool shaft.

According to an embodiment of the invention, the first tool part comprises, or constitutes, a reamer.

According to an embodiment of the invention, the second tool part comprises at least one cutting edge. The cutting edge of the second tool part may be used for machining a valve seat of an internal combustion engine whereas the cutting edge of the first tool part may be used for simultaneous machining of the valve guide of the internal combustion engine. The cutting tool assembly is preferably a tool for valve seats and valve guides machining.

BRIEF DESCRIPTION OF THE DRAWINGS

The present invention will now be explained more closely by means of a description of various embodiments and with reference to the drawings attached hereto.

FIG. 10a discloses a side view of the first clamp block in FIG. 9a.

FIG. 10b discloses a front view of the first clamp block in FIG. 9a.

FIG. 10e discloses a top view of the first clamp block in FIG. 9a.

DETAILED DESCRIPTION OF VARIOUS EMBODIMENTS OF THE INVENTION

Figure 1:
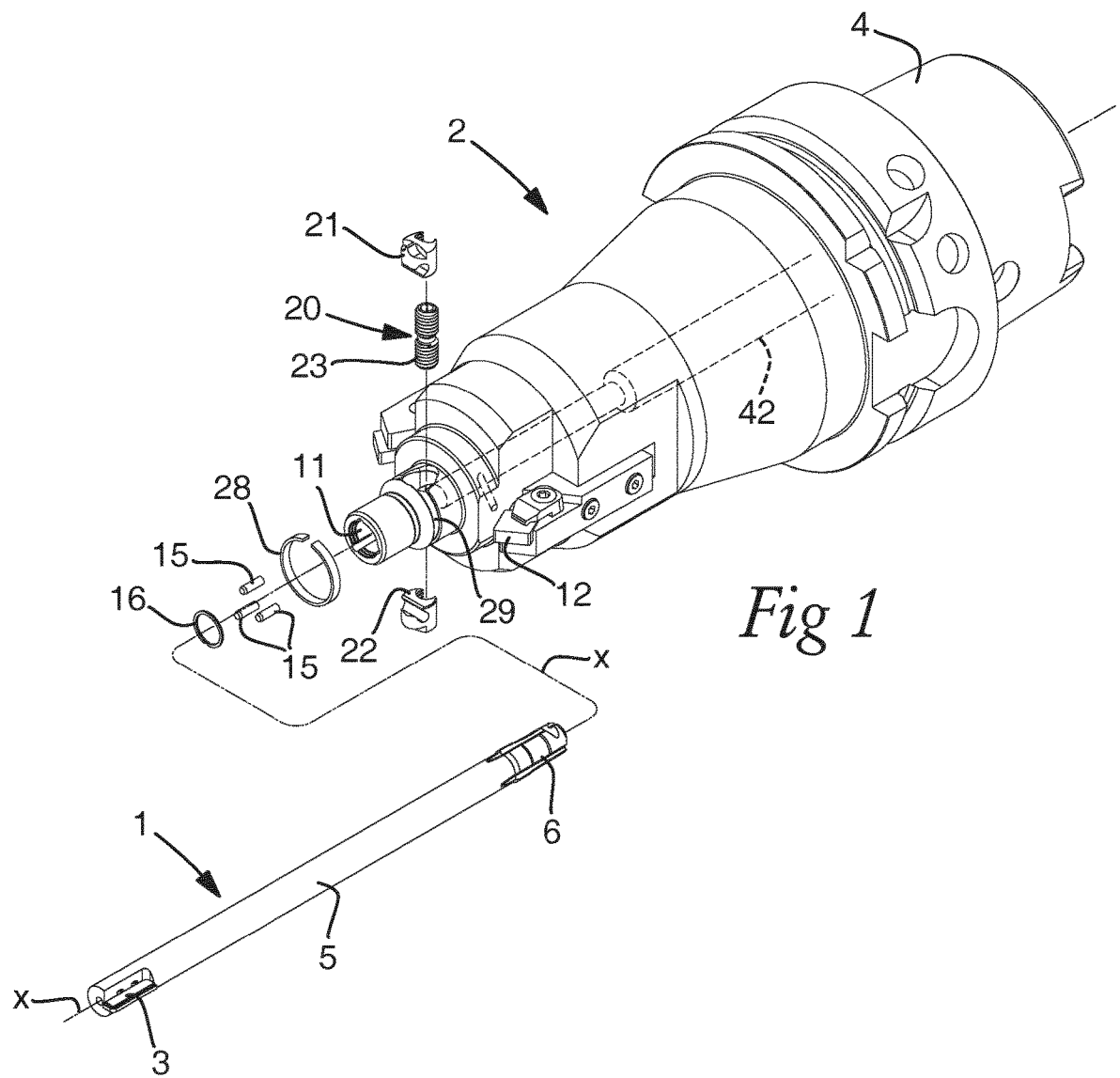
FIG. 1 discloses a perspective view of a disassembled cutting tool assembly according to an embodiment of the invention.

FIG. 1 discloses a cutting tool assembly, in particular a rotating cutting tool assembly to be received by a machine tool (not disclosed) for rotating the cutting tool assembly. It should be noted that the cutting tool assembly could also be used as a stationery tool wherein the workpiece (not disclosed) is moved, for instance rotated.

Figure 2:
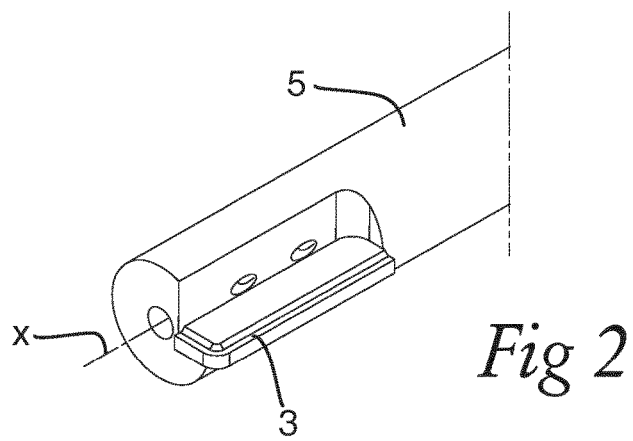
FIG. 2 discloses a perspective view of a cutting edge of a first tool part of the cutting tool assembly.

The cutting tool assembly comprises a first tool part 1 and a second tool part 2. In the embodiments disclosed, the first tool part 1 constitutes or comprises a reamer having at least one cutting edge 3, see also FIG. 2. The second tool part 2 constitutes or comprises a tool holder configured for releasably holding of the first tool part 1.

In the embodiments disclosed, the second tool part 2 comprises a rear engagement portion 4 to be received in the machine tool. Alternatively, the second tool part 2 may form an integrated part of the machine tool.

When the cutting tool assembly is assembled, the first tool part 1 and the second tool part extend along a longitudinal axis x. The first tool part 1 is elongated, and may have an axial length that is at least 2 or 3 or 4 or 5 or 6 or 7 or 8 or 9 or 10 or more times the cutting diameter. The cutting diameter is defined as two times the distance between the longitudinal axis x and the cutting edge 3 of the first tool part 1.

The first tool part 1 comprises a forward end portion 5 comprising the cutting edge 3 and a rearward end portion 6. The forward end portion 5 comprises or forms an elongated tool shaft carrying the cutting edge 3. The cutting edge 3 may be comprised by a hard metal insert seated in a seat of the forward end portion 5, e.g. removably attached or soldered in the seat, or may be integrally formed with the forward end portion 5.

Figure 7:
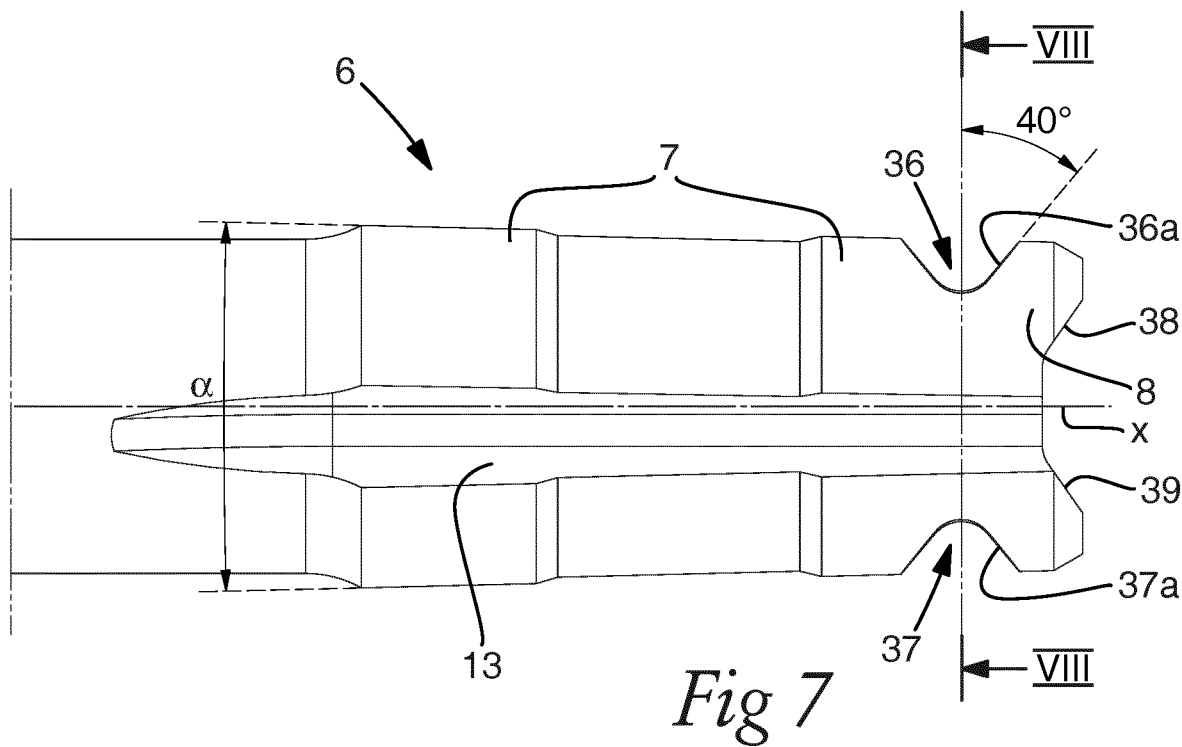
FIG. 7 discloses a side view of a rear portion of the first tool part of the cutting tool assembly.

The rearward end portion 6, see FIG. 7, comprises a conical section 7, tapering away from the forward end portion 5, and an engagement section 8 located rearwards the conical section 7.

In the embodiments disclosed, the forward end portion 5 of the first tool part 1 is integrally formed with the rearward end portion 6 of the first tool part 1.

Figure 4:
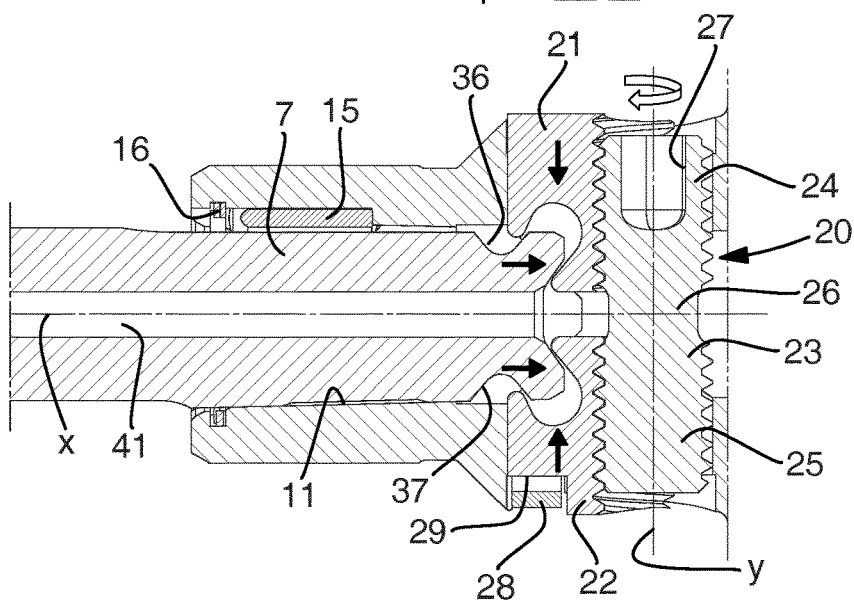
FIG. 4 discloses a longitudinal section of a clamping device of the cutting tool assembly during a clamping operation.
Figure 5:
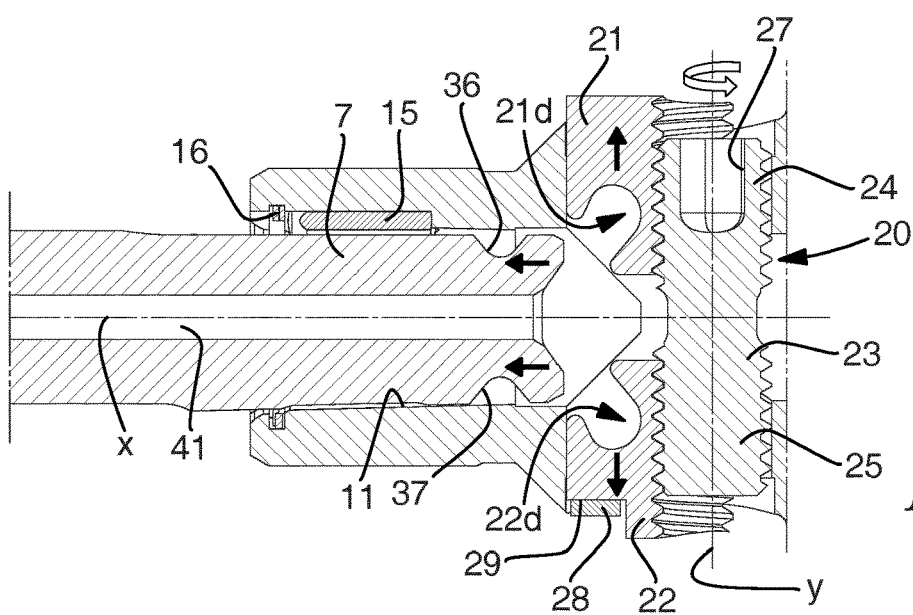
FIG. 5 discloses a longitudinal section of the clamping device during a releasing operation.

The second tool part 2 comprises a conical recess 11 for receiving of the conical section 7 of the first tool part 1, see FIGS. 4 and 5. The second tool part 2 may also comprise at least one cutting edge 12 as can be seen in FIG. 1.

The cutting tool assembly is configured for machining of elongated holes, i.e. relatively long and thin holes, such as valve guides for internal combustion engines in the automotive industry, by means of the cutting edge 3 of the first tool part 1. Due to its elongated shape, the first tool part 1 is suitable for being introduced into the valve guide. In the same machining operation, and thus simultaneously, the cutting tool assembly may permit machining of the valve seat extending around the valve guide by means of the cutting edge 12 of the second tool part 2.

Figure 6:
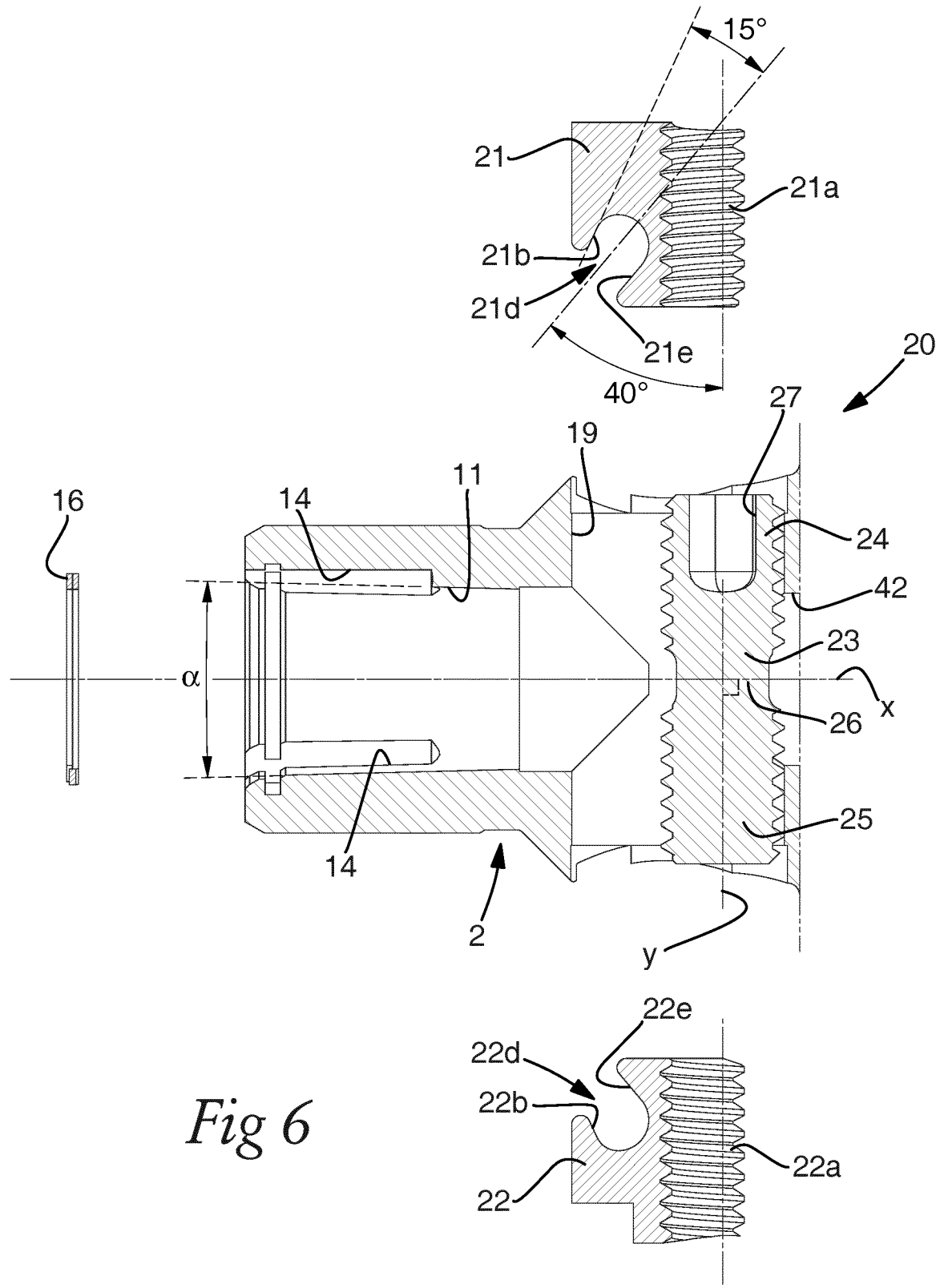
FIG. 6 discloses an exploded longitudinal section of the clamping device in FIGS. 4 and 5.

The conical section 7 of the rearward end portion 6 of the first tool part 1 has a cone angle α, wherein $0.5° \leq \alpha \leq 10°$, preferably 0.5°≤α≤7°, more preferably 0.5°≤α≤4°, see FIG. 7. The conical recess 11 of the second tool part may have a cone angle of the same size as the cone angle α, as illustrated in FIG. 6.

The cone angle α is thus relatively small, which means that the friction forces between the conical section 7 and the conical recess 11 may be significant. The small cone angle α implies that no axial stop is provided between the first tool part 1 and the second tool part 2.

Figure 3:
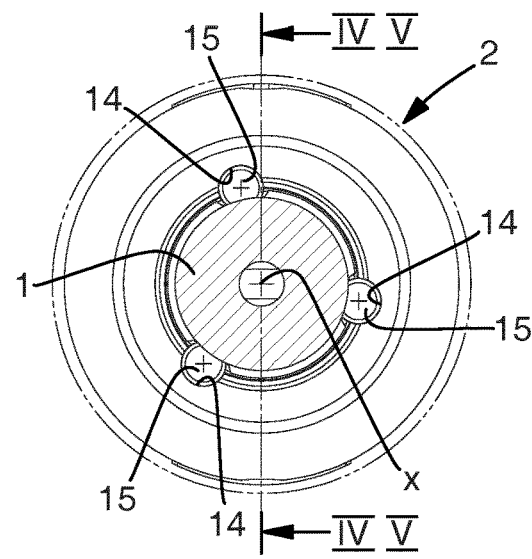
FIG. 3 discloses front view of the cutting tool assembly in an assembled state, with a transversal section through the first tool part.
Figure 8:
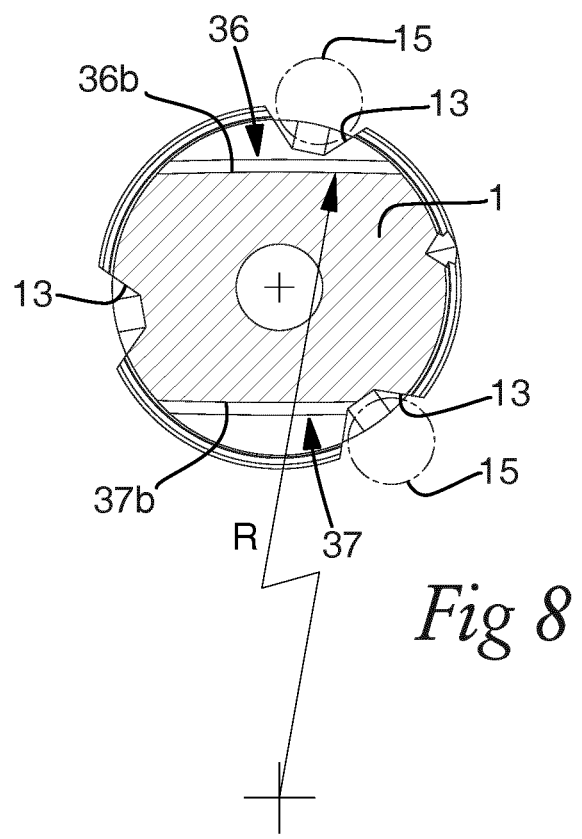
FIG. 8 discloses section along the line VIII-VIII in FIG. 7.

In the embodiments disclosed, the rearward end portion 6 of the first tool part 1 comprises three axial grooves 13 extending along the conical section 7, see FIGS. 7 and 8. The conical recess 11 of the second tool part 2 comprises three corresponding axial grooves 14, see FIGS. 3 and 6, which are located opposite to a respective one of the grooves 13 when the first tool part 1 is mounted in the second tool part 2. A pin 15 is provided in the each of the axial grooves 14 of the second tool part 2 and co-operates with the opposite axial groove 13 of the first tool part 1 to permit torque transmission between the second tool part 2 and the first tool part 1 when the first tool part 1 is mounted in the second tool part 2. The pins 15 are held in position in their respective axial groove 14 by means of an inner retaining ring 16, see FIGS. 4 and 5.

The second tool part 2 comprises a clamping device 20 located rearwards the conical recess 11 of the second tool part 2. More precisely, the clamping device 20 is provided in a transversal cavity 19 of the second tool part 2. In the embodiments disclosed, the transversal cavity 19 is provided rearwards and adjacent to the conical recess 11 and extends through the second tool part 2, i.e. all the way through the second tool part 2 as can be seen in FIGS. 4-6.

The clamping device 20 comprises a first clamp block 21, a second clamp block 22 and a differential screw 23. The differential screw 23 extends along a transversal axis y being perpendicular to the longitudinal axis x.

The differential screw 23 engages the first and second clamp blocks 21 and 22. The differential screw 23 is configured the move the first and second clamp blocks 21 and 22 in parallel with the transversal axis y away from and towards each other.

The first clamp block 21 comprises a threaded channel 21a extending in parallel with the transversal axis y through the first clamp block 21. The second clamp block 22 comprises a threaded channel 22a extending in parallel with the transversal axis y through the second clamp block 22.

The differential screw 23 comprises a first threaded part 24, cooperating with the threaded channel 21a of the first clamp block 21, and a second threaded part 25, cooperating with the threaded channel 22a of the second clamp block 22. The first threaded part 24, as well as the threaded channel of the first clamp block 21, may be a left-handed thread and the second thread part 25, as well as the threaded channel of the second clamp block 22, may be a right-handed thread, or vice-versa.

Furthermore, the differential screw 23 may comprise a restricted mid portion 26 located between the first threaded part 24 and the second threaded part 22. In the embodiments disclosed, the restricted mid portion 26 has a smaller diameter than the first and second threaded parts 24 and 25.

The differential screw 23 may also have at least one engagement insert 27 for receiving a tool for rotating the differential screw 23. In the embodiments disclosed, one engagement insert 27 extends from a first end of the differential screw 23 inside the first threaded part 24. As can be seen from FIG. 1 in combination with FIGS. 4-6, the engagement insert 27 is easily accessible from outside the cutting tool assembly by a suitable tool.

Figure 10A:
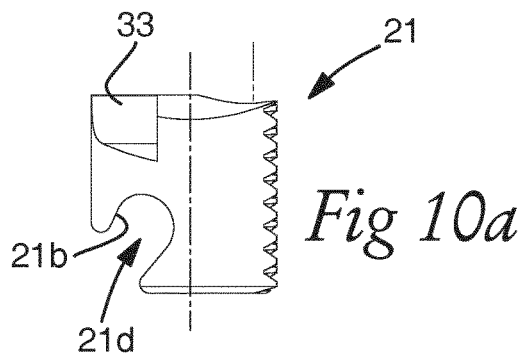
Figure 10B:
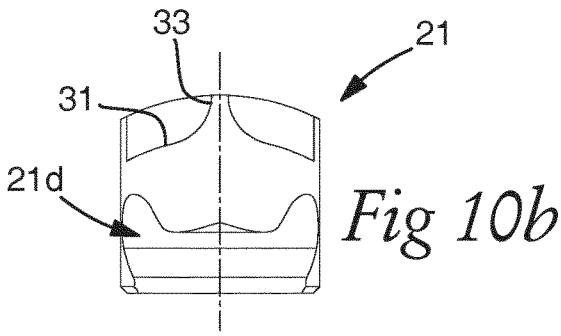
Figure 10C:
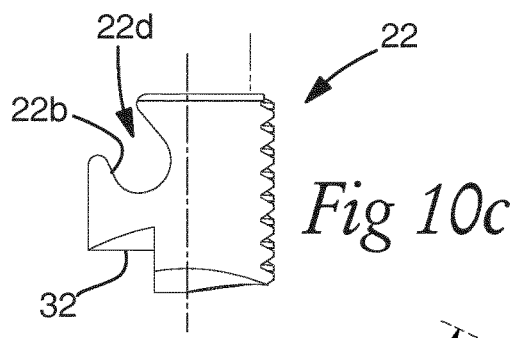
FIG. 10c discloses a side view of the second clamp block in FIG. 9b.
Figure 10D:
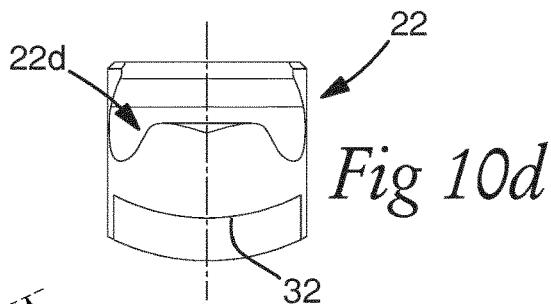
FIG. 10d discloses a front view of the second clamp block in FIG. 9b.

The first clamp block 21 and the second clamp block 22 comprise a respective engagement surface 21b and 22b, which are arranged to engage the engagement section 8 of the first tool part 1, when the conical section 7 is placed in the conical recess 11 of the second tool part 2, see FIGS. 6, 10a and 10c. The first tool part 1 may be pulled into a holding position in the conical recess 11 of the second tool part 2 when the first and second clamp blocks 21, 22 are moved towards each other through rotation of the differential screw 23.

As can be seen in FIGS. 4-6, 11, 12, 12a and 12b, the differential screw 23 protrudes rearwards from the first and second clamp blocks 21, 22 beyond the threaded channels 21b, 22b.

Figure 9A:
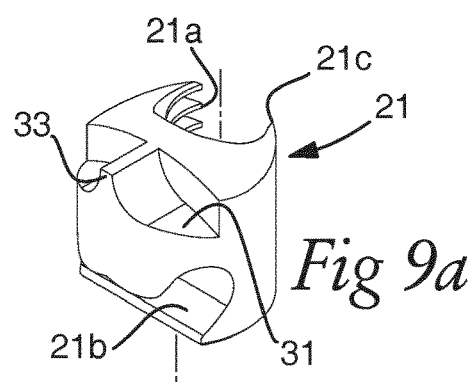
FIG. 9a discloses a perspective view of a first clamp block of the clamping device.
Figure 9B:
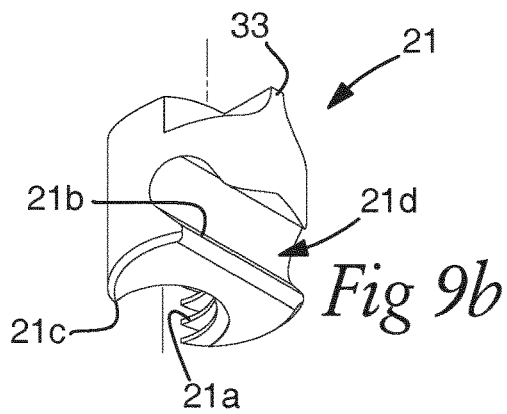
FIG. 9b discloses another perspective view of the first clamp block.
Figure 9C:
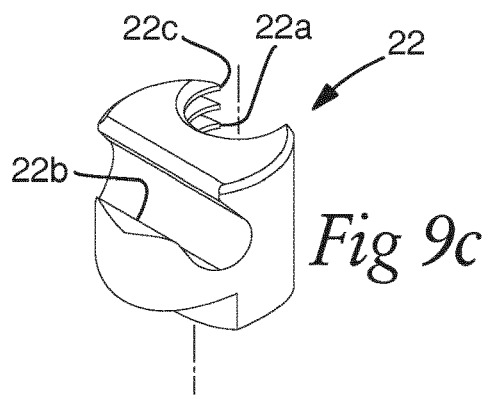
FIG. 9c discloses a perspective view of a second clamp block of the clamping device.
Figure 9D:
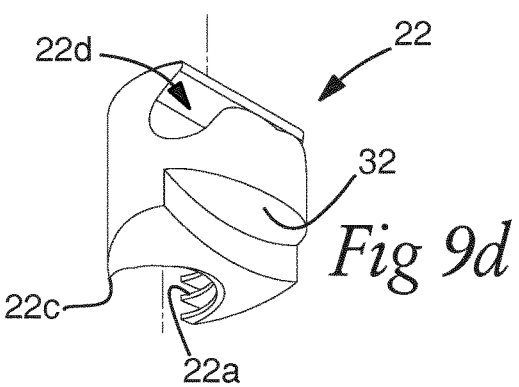
FIG. 9d discloses another perspective view of the second clamp block.
Figure 10E:
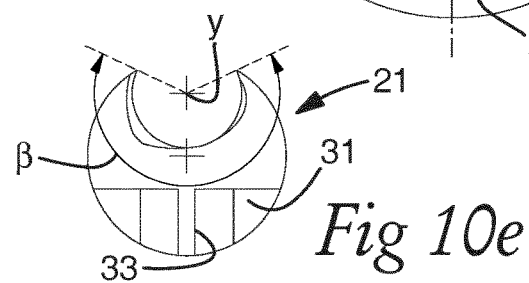
Figure 11:
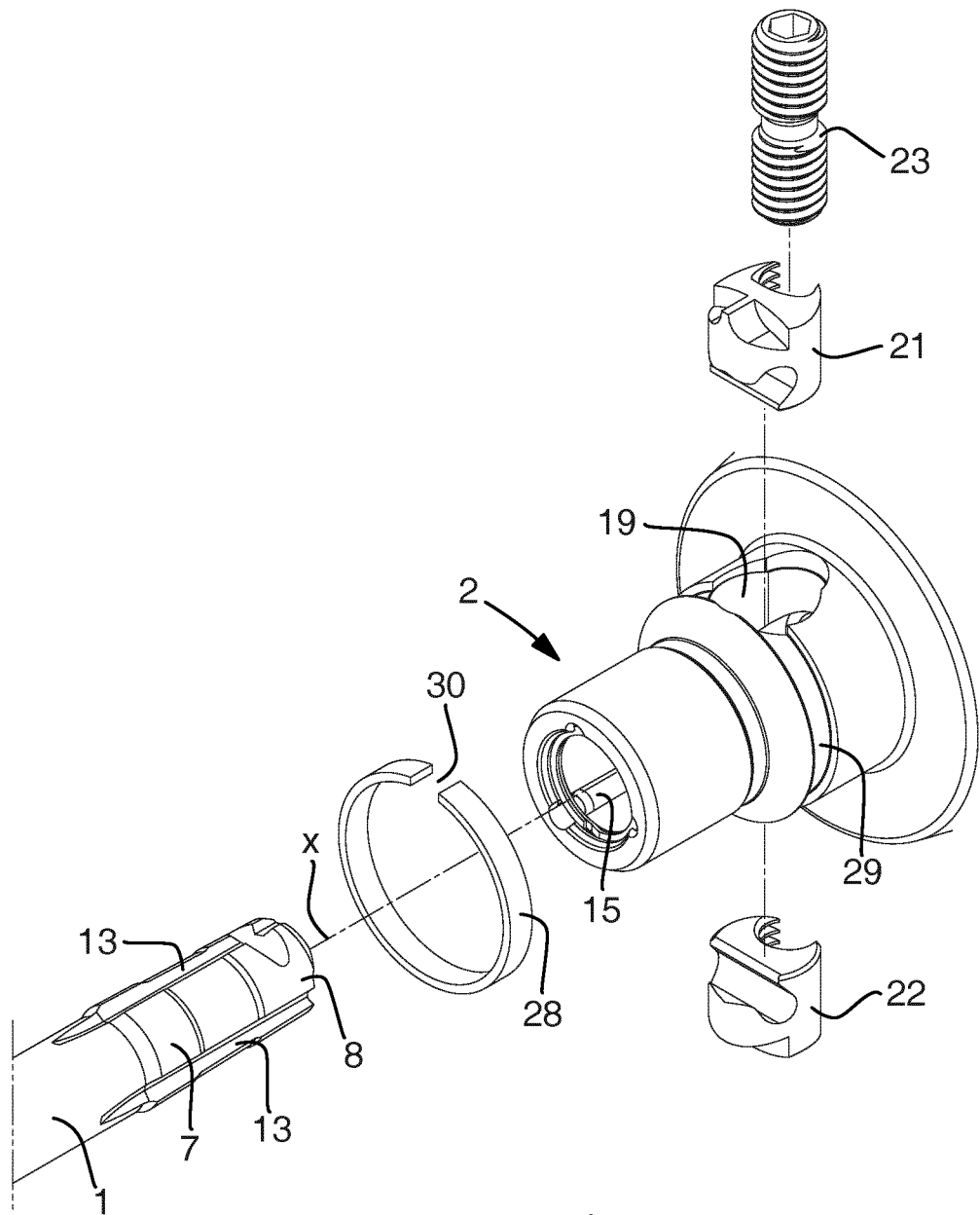
FIG. 11 discloses an exploded perspective view of the clamping device.
Figure 12:
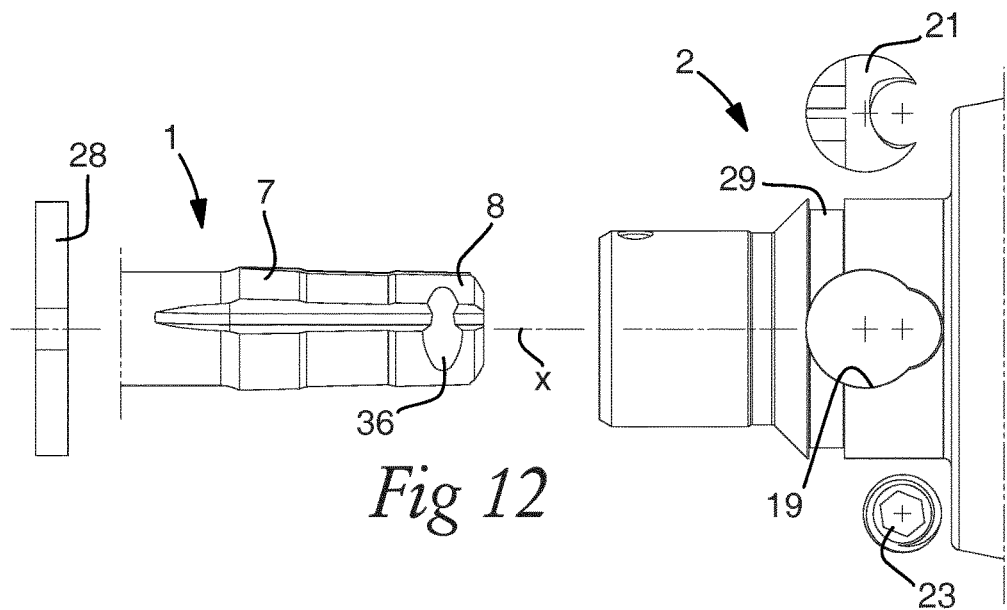
FIG. 12 discloses a top view of the clamping device in a disassembled state.
Figure 12A:
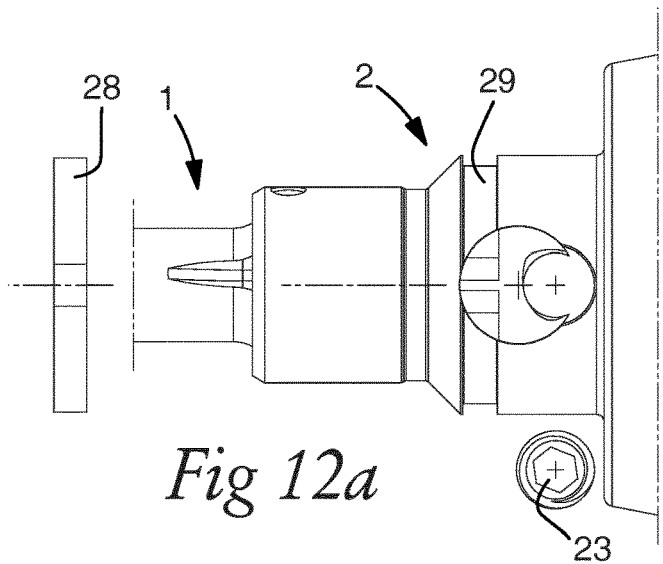
FIG. 12a discloses a top view of the clamping device in a partly assembled state.
Figure 12B:
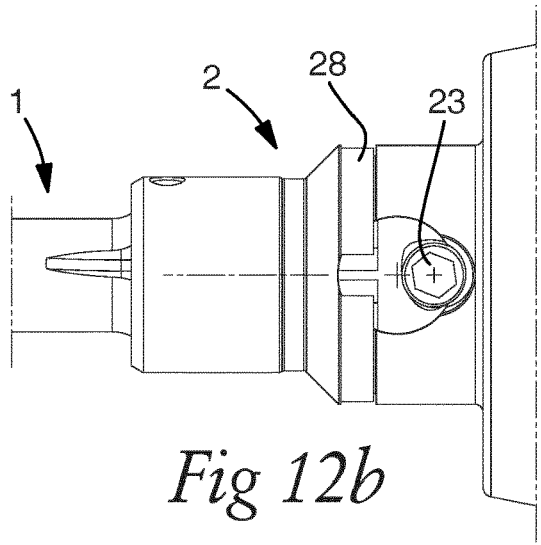
FIG. 12b discloses a top view of the clamping device in an assembled state.

In the embodiments disclosed, the threaded channel 21a of the first clamp block 21 and the threaded channel 22a of the second clamp block 22 have a respective elongated opening 21c and 22c, see in particular FIGS. 9a, 9c and 10e. The elongated opening 21c, 22c extend in parallel with the transversal axis through a rearward end of the first and second clamp blocks 21, 22, respectively. The differential screw 23 protrudes rearwards through the openings 21c, 22c, which permits to design the clamping device 20 with a short axial length. As can be seen in FIG. 12, the transversal cavity 19 that houses the clamping device 20 may be formed by two overlapping holes that extend diametrically through the second tool part 2. A first rearward hole may house the protruding part of the differential screw 23 and a second forward hole may house the clamp blocks 21, 22. The first hole has a smaller diameter than the second hole.

As can be seen in FIG. 10e, each of the threaded channels 21a, 22a may, seen in a plane perpendicular to the transversal axis y, have a central angle β having a first ray that intersects a first edge of the elongated opening 21c, 22c and a second ray that intersects a second edge of the elongated opening 21c, 22c, wherein 180°<β<360°, preferably 200°≤β≤320°, more preferably 220°≤β≤300°. In the embodiments disclosed, β=240°. The central angle β of the threaded channel 22a of the second clamp block 22 may be equal to the central angle length β of the first clamp block 21.

The central angle β should be great enough to ensure that the differential screw 23 is retained in the threaded channels 21a, 22a, but short enough to permit a short axial length and a compactness of the clamping device 20.

In order to retain the clamping device 20 in the transversal cavity 19 of the second tool part 2, an elastic retaining ring 28 may be provided and extend around the second tool part 2 and the first and second clamp blocks 21, 22, see FIGS. 1, 4, 5 and 12b. The retaining ring 28 may be provided in a circumferential groove 29 of the second tool part 2. The circumferential groove 29 may be axially located at the transversal cavity 19, in particular at a forward end of the transversal cavity 19 as can be seen in especially FIGS. 11 and 12. The retaining ring 28 may be a kind of split ring with a short gap 30 between two adjacent ends of the retaining ring 28, see FIG. 11.

The first clamp block 21 may comprise a recess 31 in a radially outer surface of the first clamp block 21. The recess 31 may be designed to receive a part of the retaining ring 28 when the first clamp block 21 is provided in the transversal cavity 19.

In the same way, the second clamp block 22 may comprise a recess 32 in a radially outer surface of the second clamp block 22. The recess 32 may be designed to receive an opposite part of the retaining ring 28 when the second clamp block 22 is provided in the transversal cavity 19.

The recess 31 of the first clamp block 21 may, in contrast to the recess 32 of the second clam block 22, have a protrusion 33 that may be located at a central position of the recess 31. The protrusion 33 may be designed to extend into the gap 30 of the retaining ring 28, when the retaining ring 28 is provided in the circumferential groove 29.

In the embodiments disclosed, the engagement section 8 of the rearward end portion 6 of the first tool part 1 comprises a first transversal groove 36 and a second transversal groove 37, see in particular FIGS. 7 and 8. The transversal groove 36, 37 are separated from and located diametrically opposite to each other. The transversal grooves 36, 37 may comprise a respective inclined forward surface 36a, 37a turned towards the conical section 7. In the embodiments disclosed, the inclined forward surfaces 36a, 37 forms an angle of 40° to the transversal axis y as can be seen in FIG. 7. The transversal grooves 36, 37 may ensure a high strength of the engagement section 8. In particular, the strength may be improved in comparison to only one circumferential groove extending all the way around the engagement section.

Each of the first and second transversal grooves 36, 37 may have a bottom line 36b, 37b being perpendicular to the longitudinal axis x when seen in a direction from the first transversal groove 36 to the second transversal groove 37. As has been illustrated in FIG. 8, the bottom line 36b, 37b may be is convexly curved. The convexly curved bottom line 36b, 37b may contribute to further ensure the strength of the engagement section 8 of the first tool part 1 when large pulling forces are applied to the engagement section 8 and the first and second transversal grooves 36, 37. The bottom line 36b, 37b may have a radius R of curvature that is longer than a smallest radial distance from the bottom line 36b, 37b to the longitudinal axis x.

In the embodiments disclosed, the engagement surface 21b, 22b of the first and second clamp blocks 21, 22 may engage a respective one of the inclined forward surfaces 36a, 37a, as illustrated in FIGS. 4 and 5. The engagement surfaces 21b, 22b are comprised by a respective recess 21d, 22d, see FIG. 6. Each recess 21d, 22d may have a mid plane forming an angle of about 40° to the transversal axis y. The engagement surfaces 21d, 22d may form an angle of about 15° to the mid plane.

When the first and second clamp blocks 21, 22 are moved towards each other through the rotation of the differential screw 23, see FIG. 4, the engagement surface 21b of the first clamp block 21 engages the inclined forward surface 36a of the first transversal groove 36, and the engagement surface 22b engages the inclined forward surface 37a of the second transversal groove 37, wherein further moving of the first and second clamp blocks 21, 22 may pull the first tool part 1 into the holding position in the conical recess 11.

Furthermore, the engagement section 8 may comprise two inclined rearward surfaces 38, 39 turned away from the conical section 7, see FIG. 7. In the embodiments disclosed, the inclined rearward surfaces 38, 39 are provided on a rearward end surface of the rearward end portion 6 of the first tool part 1.

Each of the clamp blocks 21, 22 may also comprise a respective forward surface 21e, 22e turned towards an outer end of the conical recess 11. In the embodiments disclosed, the forward surface 21e of the first clamp block 21 is located opposite to the engagement surface 21c in the recess 21d, and the forward surface 22e of the second clamp block 22 is located opposite to the engagement surface 22c in the recess 22d.

The rearward surfaces 38 is configured to be engaged by the forward surface 21e of the first clamp block 21, and rearward surfaces 39 is configured to be engaged by the forward surface 22e of the second clamp block 22 when the first and second clamp blocks 21, 22 are moved away from each other, see FIG. 5, wherein the first tool part 1 may be pushed out of the holding position in the conical recess 11.

The cutting tool assembly may also comprise a coolant system for the supply of coolant to the cutting edge 3. The coolant system comprises a first central channel 41 through the first tool part 1 and a second central channel 42 through the second tool part 2, see FIG. 1. The clamping device 20 may be configured to permit coolant to flow through the second central channel 42 into the first central channel 41 to an opening adjacent to the cutting edge 3, see FIG. 2, thereby bypassing the restricted mid portion 26 of the differential screw 23.

The coolant system may also comprise a coolant conduit from the second central channel 42 to an opening adjacent to the cutting edge 12, see FIG. 1.

The present invention is not limited to the embodiments disclosed but may be varied and modified within the scope of the following claims.

The invention claimed is:

1. A cutting tool assembly comprising:
   a first tool part having at least one cutting edge; and
   a second tool part arranged for releasably holding the first tool part, the first tool part extending along a longitudinal axis, wherein the first tool part includes a forward end portion including the at least one cutting edge and a rearward end portion including a conical section tapering away from the forward end portion, and an engagement section located rearwards the conical section, the second tool part including a conical recess arranged for receiving the conical section of the first tool part, and a clamping device located rearwards the conical recess, the clamping device being provided in a transversal cavity of the second tool part and having a first clamp block, a second clamp block and a differential screw extending along a transversal axis and engaging the first and second clamp blocks, wherein the differential screw is configured to move the first and second clamp blocks in parallel with the transversal axis away from and towards each other, wherein the first and second clamp blocks include a respective engagement surface arranged to engage the engagement section of the first tool part when the conical section is placed in the conical recess in order to pull the first tool part into a holding position in the conical recess when the first and second clamp blocks are moved towards each other, and wherein each of the first and second clamp blocks includes a respective threaded channel extending in parallel with the transversal axis and receiving the differential screw protruding rearwards from the first and second clamp blocks beyond the threaded channels, wherein each of the threaded channels has an elongated opening, which extends in parallel with the transversal axis through a rearward end of the first and second clamp blocks, respectively, and wherein the differential screw protrudes rearwards through the openings.

2. The cutting tool assembly according to claim 1, wherein, as seen in a plane perpendicular to the transversal axis, each of the threaded channels has a central angle β having a first ray that intersects a first edge of the elongated opening and a second ray that intersects a second edge of the elongated opening, and wherein 180°<β<360°.

3. The cutting tool assembly according to claim 1, wherein the clamping device includes an elastic retaining ring extending around the second tool part and the first and second clamp blocks, and wherein the retaining ring retains the first and second clamp blocks in the transversal cavity of the second tool part.

4. The cutting tool assembly according to claim 1, wherein the differential screw includes a first threaded part cooperating with the threaded channel of the first clamp block and a second threaded part cooperating with the threaded channel of the second clamp block, and wherein at least one of the first threaded part and the second threaded part protrudes rearwards from the respective first and second clamp block beyond the respective threaded channel.

5. The cutting tool assembly according to claim 1, wherein the cutting tool assembly includes a coolant system for the supply of coolant to the cutting edge, wherein the coolant system includes a first central channel through the first tool part and a second central channel through the second tool part, and wherein the clamping device and/or the transversal cavity is configured to permit coolant to flow through the second central channel into the first central channel.

6. The cutting tool assembly according to claim 5, wherein the differential screw includes a restricted mid portion between the first threaded part and the second threaded part, and wherein the coolant is permitted to flow through the second central channel into the first central channel thereby bypassing the restricted mid portion of the differential screw.

7. The cutting tool assembly according to claim 1, wherein the engagement section includes a first transversal groove and a second transversal groove, which are separated from and located diametrically opposite to each other and include a respective inclined forward surface turned towards the conical section.

8. The cutting tool assembly according to claim 7, wherein the first and second clamp blocks include a respective engagement surface engaging a respective one of the inclined forward surfaces in order to pull the first tool part into the holding position in the conical recess when the first and second clamp blocks are moved towards each other.

9. The cutting tool assembly according to claim 7, wherein each of the first and second transversal grooves has a bottom surface, which is perpendicular to the longitudinal axis when seen in a direction from the first transversal groove to the second transversal groove.

10. The cutting tool assembly according to claim 9, wherein the bottom surface is convexly curved.

11. The cutting tool assembly according to claim 10, wherein the bottom surface has a radius of curvature being longer than a smallest radial distance from the bottom line to the longitudinal axis.

12. The cutting tool assembly according to claim 1, wherein the engagement section includes two inclined rearward surfaces turned away from the conical section and configured to be engaged by a respective forward surface of the first and second clamp blocks in order to push the first tool part out of the holding position in the conical recess when the first and second clamp blocks are moved away from each other.

13. The cutting tool assembly according to claim 1, wherein the conical section of the rearward end portion of the first tool part has a cone angle α, and wherein $0.5° \leq \alpha \leq 10°$.

14. The cutting tool assembly according to claim 1, wherein the rearward end portion of the first tool part includes at least one axial groove extending along the conical section, wherein the conical recess of the second tool part includes at least one axial groove, and wherein a pin is provided in the at least one axial groove of the second tool part and arranged to co-operate with the at least one axial groove of the first tool part to permit torque transmission between the second tool part and the first tool part when the first tool part is mounted in the second tool part.

15. The cutting tool assembly according to claim 1, wherein the forward end portion of the first tool part is integrally formed with the rearward end portion of the first tool part.

16. The cutting tool assembly according to claim 1, wherein the first tool part includes a reamer.

17. The cutting tool assembly according to claim 1, wherein the second tool part includes at least one cutting edge.

18. The cutting tool assembly according to claim 1, wherein the cutting tool assembly is a rotating cutting tool assembly.

* * * * *